Sept. 5, 1967 W. J. WANVIG 3,339,295

MATHEMATICS INSTRUCTING DEVICE

Filed May 17, 1965 7 Sheets-Sheet 1

WILLARD J. WANVIG
INVENTOR
BY
BUCKHORN, BLORE, KLARQUIST & SPARKMAN
ATTORNEYS

WILLARD J. WANVIG
INVENTOR
BY
BUCKHORN, BLORE, KLARQUIST & SPARKMAN
ATTORNEYS

Sept. 5, 1967 W. J. WANVIG 3,339,295

MATHEMATICS INSTRUCTING DEVICE

Filed May 17, 1965 7 Sheets-Sheet 3

WILLARD J. WANVIG
INVENTOR

BY
BUCKHORN, BLORE, KLARQUIST & SPARKMAN
ATTORNEYS

WILLARD J. WANVIG
INVENTOR
BY
BUCKHORN, BLORE, KLARQUIST & SPARKMAN
ATTORNEYS

WILLARD J. WANVIG
INVENTOR
BY
BUCKHORN, BLORE, KLARQUIST & SPARKMAN
ATTORNEYS

WILLARD J. WANVIG
INVENTOR
BY
BUCKHORN, BLORE, KLARQUIST & SPARKMAN
ATTORNEYS

WILLARD J. WANVIG
INVENTOR
BY
BUCKHORN, BLORE, KLARQUIST & SPARKMAN
ATTORNEYS

United States Patent Office 3,339,295
Patented Sept. 5, 1967

3,339,295
MATHEMATICS INSTRUCTING DEVICE

Willard J. Wanvig, 6641 SE. Lake Road, Milwaukie, Oreg. 97222

Filed May 17, 1965, Ser. No. 456,131
11 Claims. (Cl. 35—31)

ABSTRACT OF THE DISCLOSURE

An instructing device including a chart having numerals thereon in a predetermined array and a frame surrounding the chart adapted to receive a pair of masks in registry in front of the chart. Each such mask is provided with a plurality of apertures for exposing a given number between one and ten as well as multiples thereof. When two such masks corresponding to two different given numbers are placed in front of the chart, the masks expose numerals of which the given numbers are factors.

This invention relates to a mathematics instructing device, and more particularly to a factoring board.

An object of the invention is to provide a new mathematics instructing device.

Another object of the invention is to provide a factoring board.

A further object of the invention is to provide a display device for teaching multiplication, division, negative numbers, prime numbers, reducing fractions and other mathematical concepts.

Another object of the invention is to provide a simple, durable mathematics instructing device which is also compact and is easily manipulated.

The invention provides a mathematics instructing device including a chart having numerals arranged in a predetermined pattern, and a mask adapted to be placed on the chart in registry therewith and having apertures therein exposing only selected ones of the numerals. In a mathematics device forming a specific embodiment of the invention, a display frame having a storage compartment at the rear of a central panel thereof has a number chart on the front face of the central panel, and also includes panel-like factor masks adapted to be held in positions overlaying and in registry with the chart by a ledge of the frame and stop means positioned at one side of hte frame. Each factor mask has apertures therein adapted to display only one given numeral of the chart and all multiples thereof for as high as the numerals on the chart go. When a plurality of the masks are superimposed in front of the chart, only the product of the different factors of the masks and all multiples of the product, for as high as the chart goes in numerals, are exposed to view. A second chart having positive and negative numbers may be placed over the first chart and the factoring masks used therewith. A further mask having apertures exposing only prime members may be placed over the first chart to show the prime numbers.

A complete understanding of the invention may be obtained from the following detailed description of a mathematics instructing device forming a specific embodiment thereof, when read in conjunction with the appended drawings, in which.

*Detailed description*

Figures 1, 2:
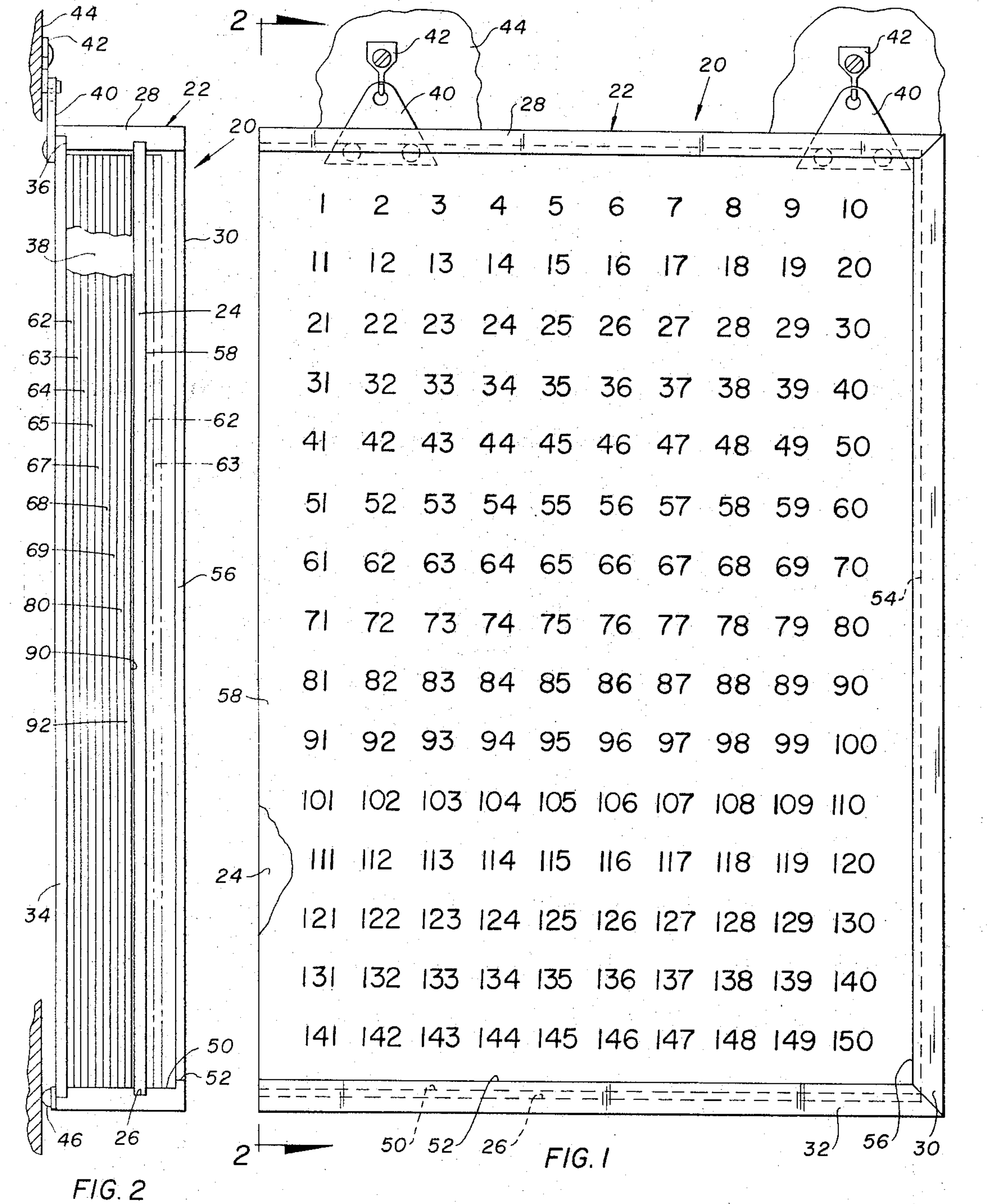
FIG. 1 is a front elevational view of a mathematics instructing device forming a specific embodiment of the invention.
FIG. 2 is a side elevational view of the mathematics instruction device of FIG. 1.

Referring now in detail to the drawings, a mathematics instructing device 20 shown therein comprises a combined storage and display frame 22 having a central, chart-exhibiting panel 24 of plywood or other suitable material glued at its edge portions in a groove 26 formed in the central portion of an integral U-shaped edge frame composed of top member 28, side member 30 and bottom member 32. The frame 22 includes a back panel 34 secured in a dado groove 36 and forming a storage compartment 38. Hangers 40 secured to the frame serve to suspend the frame from hooks 42 (FIG. 2) on an easel, wall or map rail 44, and a rubber cushioned spacer 46 secured to the frame tilts the front of the frame slightly upwardly and rearwardly, as viewed in FIG. 2. The bottom member 32 has a ledge 50 having a front retaining lip or flange 52. The side member 30 has a stop 54 and an overhanging retaining lip or flange 56. A chart 58 adhered to the front face of the central panel 24 has fifteen vertically spaced horizontal rows of ten consecutive numerals each proceeding from 1 to 150 visible from the front of the frame as illustrated in FIG. 1.

Figure 3:
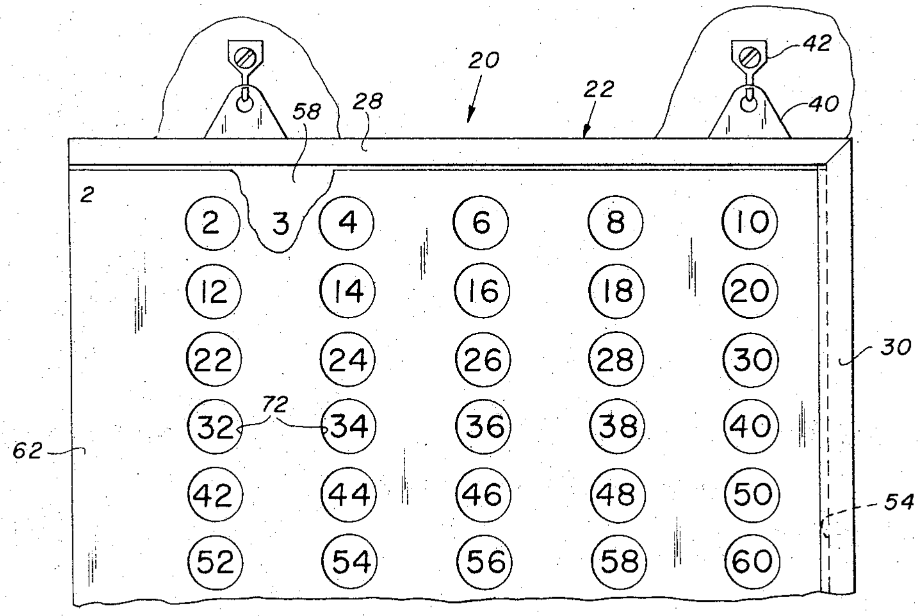
FIGS. 3 to 10 are front elevational views of the device of FIG. 1 with different factoring masks thereof in operative positions.
Figure 4:
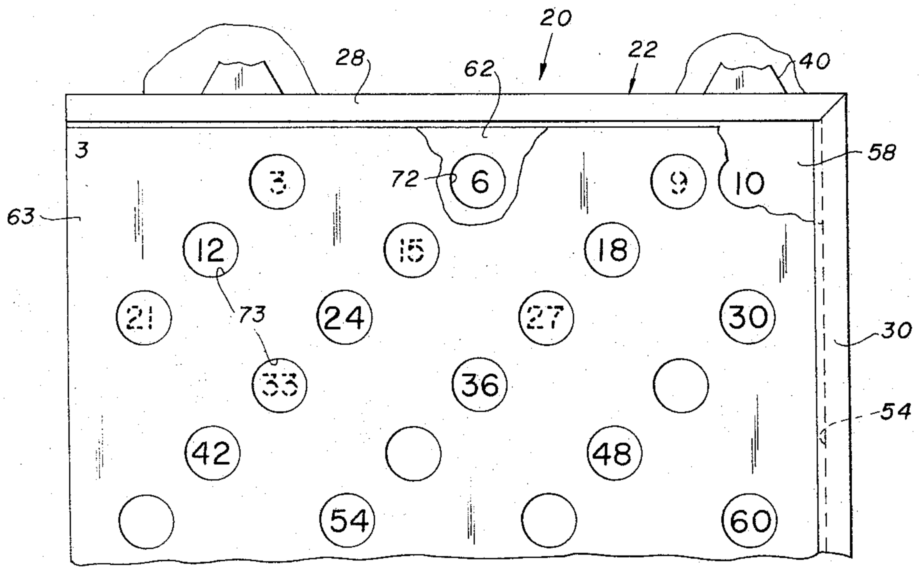
Figure 5:
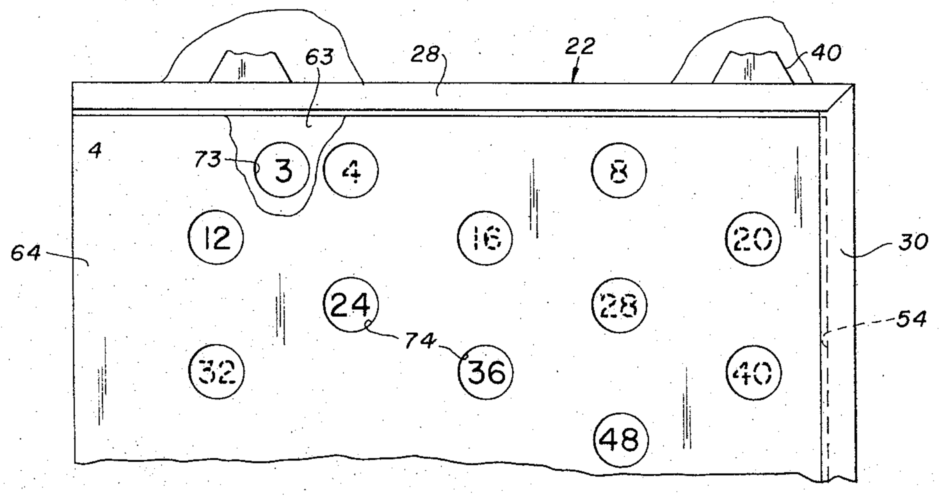
Figure 6:
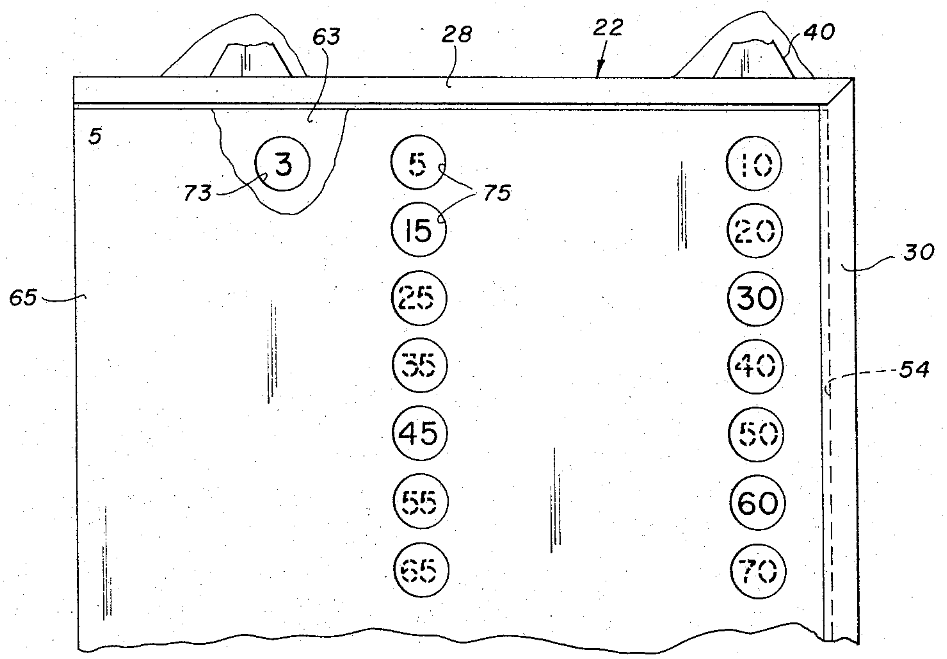
Figure 8:
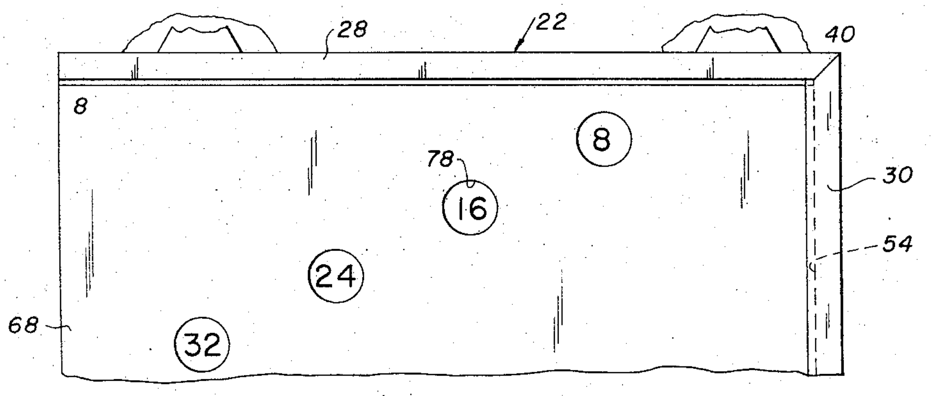
Figure 7:
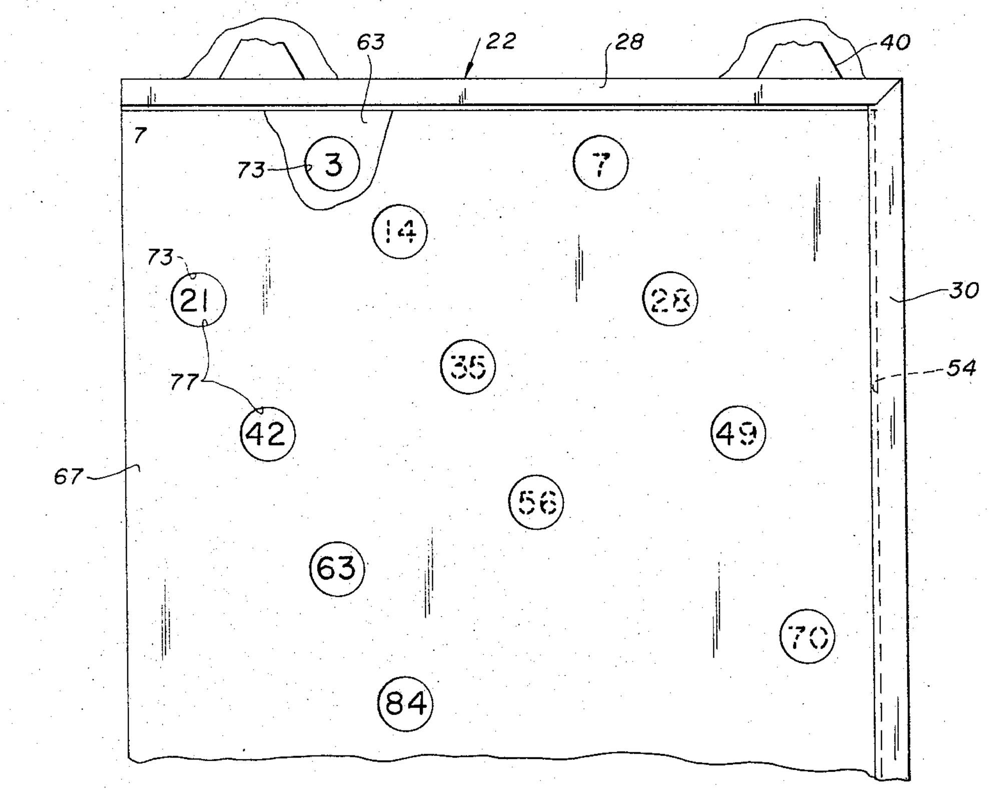
Figure 9:
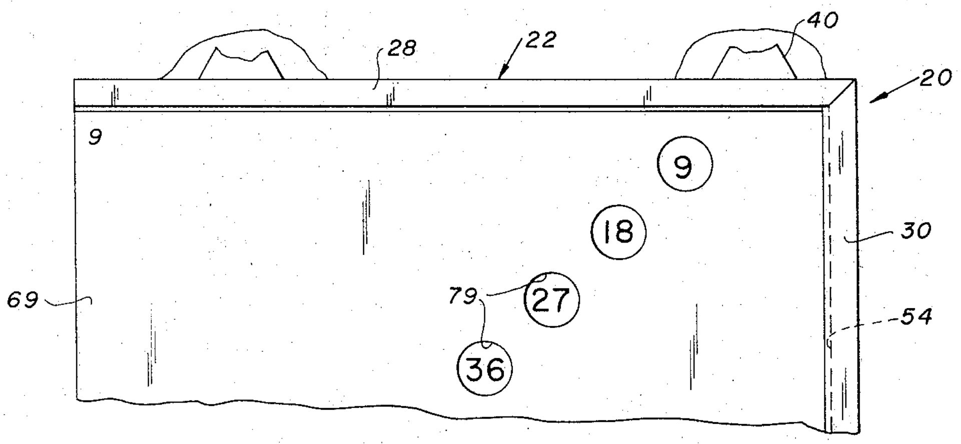

Seven factor masks or overlays 62, 63, 64, 65, 67, 68 and 69 (FIG. 2) are provided for teaching facts of 2, 3, 4, 5, 7, 8 and 9, respectively, and any combinations or multiples of these factors. The mask 62 (FIG. 3) when placed on the ledge 50 and in engagement with the stop 54 covers all the numerals of the chart 58 except the numeral 2 and all multiples thereof up to 150, which proceed consecutively in horizontal rows from left to right as viewed on the chart. Apertures 72 in the mask 62 expose the multiples of 2. The side margins of the mask 62 are so spaced relative to the spacing of the numerals on the chart from the stop 54 that when the mask 62 is reversed, only the odd numbers are exposed. As illustrated in FIG. 4, when the mask 63 is placed in registry with the mask 62, apertures 73 of the mask 63 align only with those of the apertures 72 exposing a multiple of 2 and 3. In the absence of the mask 62, the mask 63 would expose only the numeral 3 and all its multiples. Similarly, the masks 64, 65, 67, 68 and 69 have apertures 74, 75, 77, 78 and 79, which respectively expose to view only all multiples of 4, 5, 7, 8 and 9 from 1 to 150, when each is used alone. The masks can be used alone or in any desired combination to teach factors, the multiplication table, the reducing of fractions, finding lowest common denominators and the like. For example, in FIG. 5 the masks 63 and 64 being used together show the product, 12, of factors 3 and 4 and multiples thereof. In FIG. 6, the masks 63 and 65 show the product, 15, of factors 3 and 5, while in FIG. 7, the use of the masks 63 and 67 show the product, 21, of the factors 3 and 7 and the multiples thereof. FIGS. 8 and 9 illustrate the uses of the masks 68 and 69 alone to show respectively the numeral 8 and its multiples and the numeral 9 and its multiples. The numeral 6 and its multiples can be displayed by using the masks 62 and 63 in superimposed relationship and the numeral 10 and its multiples can be exhibited by superimposing the masks 62 and 65. Any other desired combinations can be effected where desired.

Figure 10:
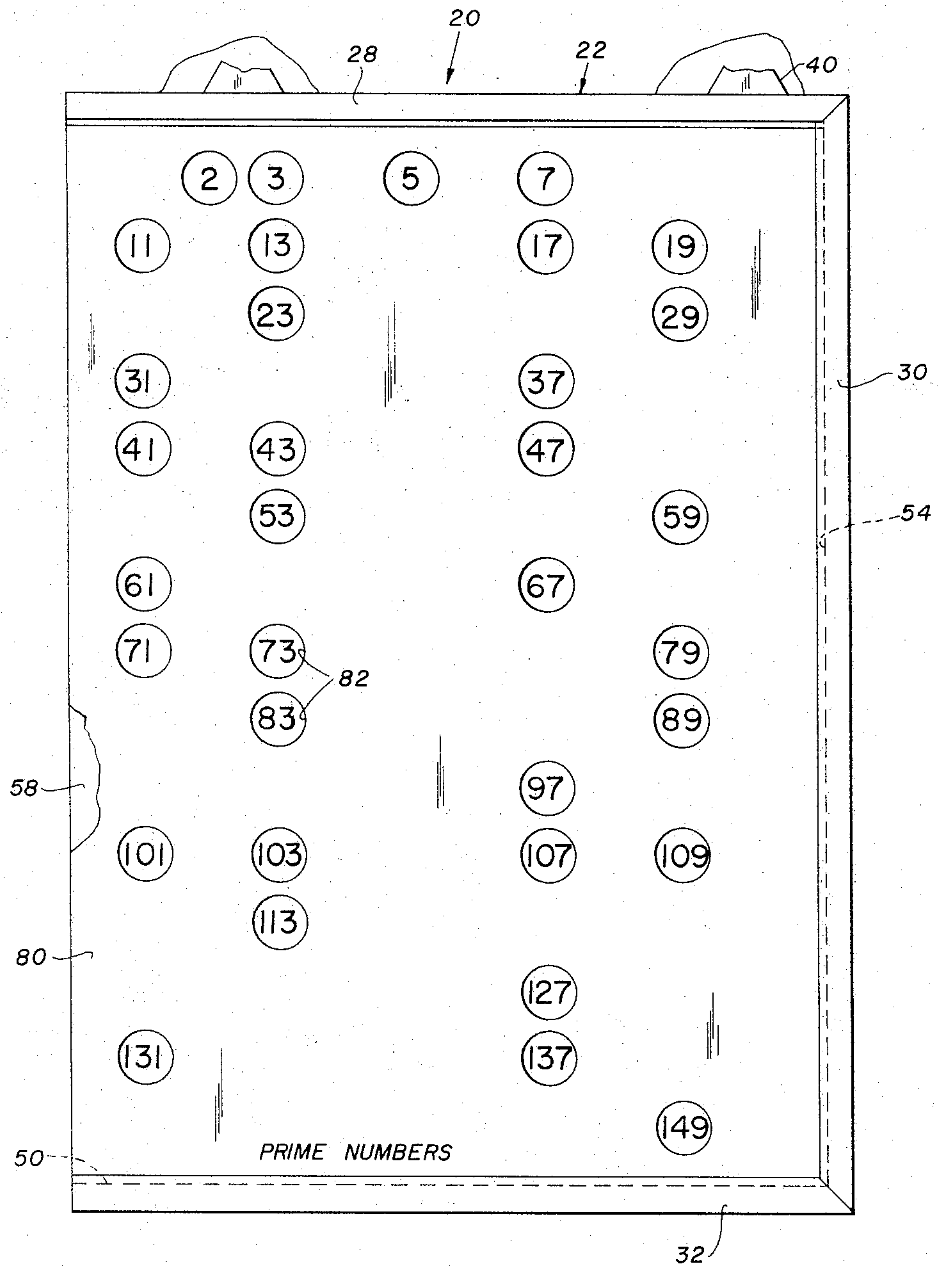

In FIG. 10 there is shown a prime number mask 80 in registry with the chart 58. The mask 80 has apertures 82 therein which expose only the prime numbers of the chart 58, and is useful in teaching prime numbers.

Figure 12:
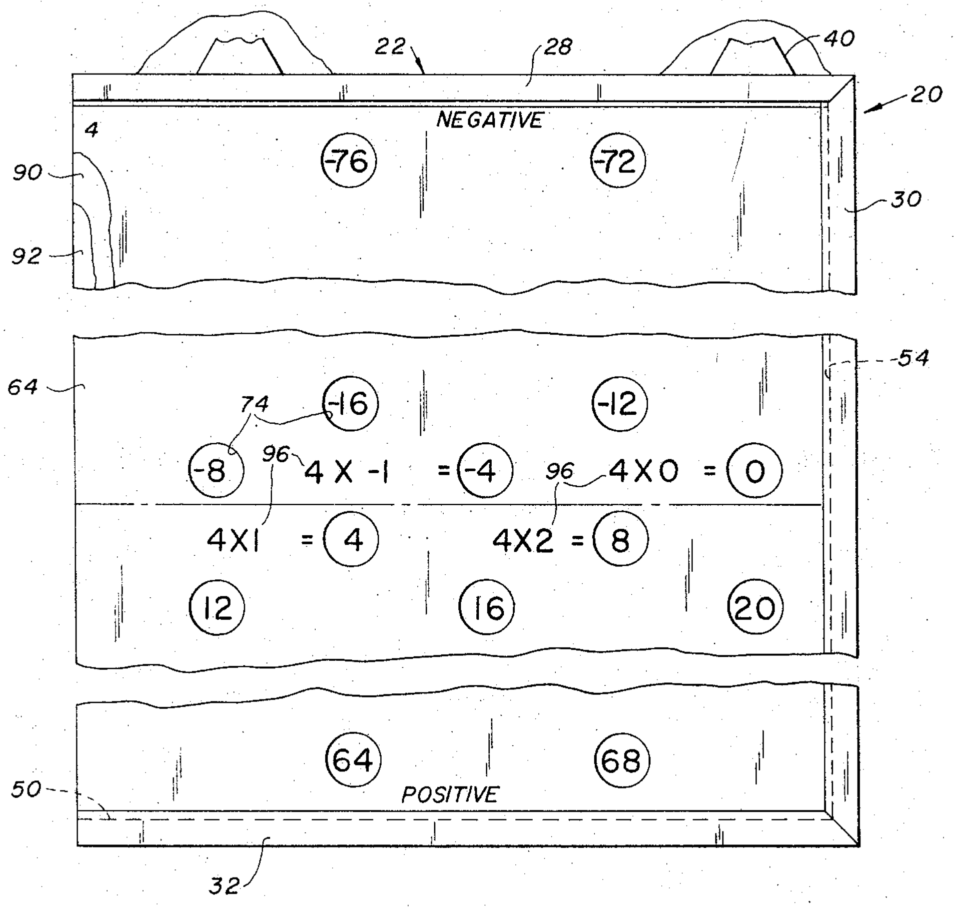
FIG. 12 is a view similar to FIG. 11 with a factoring mask overlaying the positive-negative chart.
Figure 11:
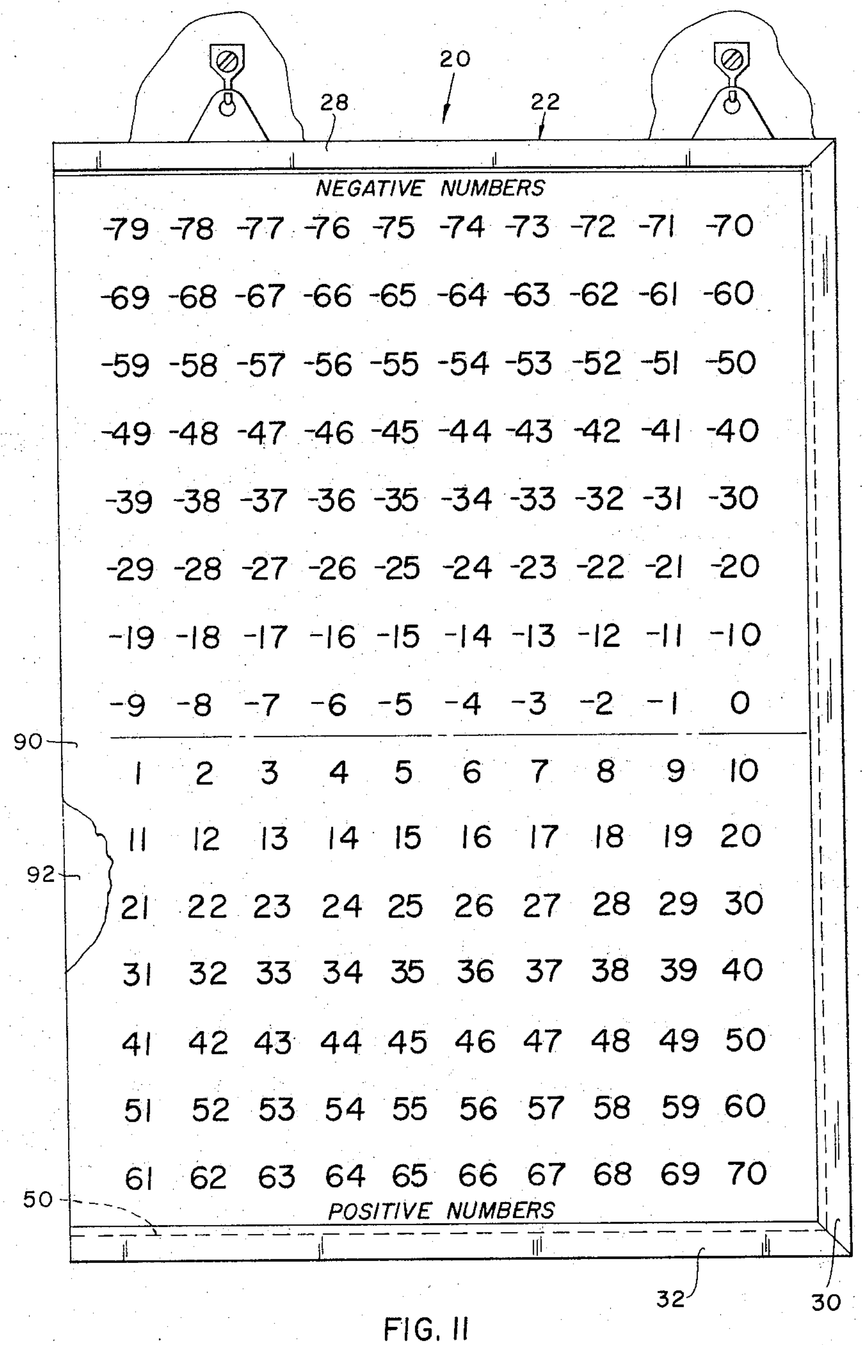
FIG. 11 is a view similar to FIG. 1 but with a positive-negative chart in operative position.

A chart 90 (FIGS. 11 and 12) having negative numbers running consecutively from 0 to —79 and positive numbers running consecutively from 1 to 70 is supported by a stiff backing panel 92. The panel 92 may be placed on the ledge 50 and one of the masks 62, 63, 64, 65, 67, 68 and 69 or any desired combination thereof may be placed in registry with and over the chart 90 to teach both negative and positive numbers. As illustrated in FIG. 12, the mask 64 is placed over the chart and equations 96 written on the face of mask 64 in chalk to help illustrate. The masks are of suitable stiff material such as masonite, composition board or the like and have on the faces thereof a chalkboard coating so that they can be marked with chalk and the markings erased when desired.

The above-described displays are by no means exhaustive and illustrate only examples of the displays which can be effected with the device 20. The device 20 is simple, inexpensive, very versatile and very effective. One further use is simply as a number chart as a number line readily visible to students at all times. Also, the entire chart having been visible just before a mask is placed thereover makes students aware of the presence of the numerals between those exposed by the mask. It has also been found to be highly useful as a motivating tool to arouse the interest of the students.

The device may be used in small scale also, and may be adapted to overhead projectors by using transparent charts and masks having apertures and adapted to be placed in registry with the charts on the projection table. The device 20 is an aid for teaching pupils to count by twos, fives and tens. It may be used for teaching and demonstrating the difference between even and odd numbers, counting by threes and fours and for introducing the multiplication facts. The device aids in teaching the factor-factor-product relationship, denominate numbers, reducing fractions, and for finding the least common denominator of two or more unlike fractions. For example, if $\frac{3}{5}$ is to be added to $\frac{5}{7}$, the five-overlay is put on the number line and reveals only the multiples of five. The seven-overlay is placed on top of the five so that only three numbers show through. It is explained that these three multiples are some of the many common denominators and that all that is necessary to find the least common denominator is to choose the smallest number that appears so that computation will be the easiest.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a mathematics instructing device, a stiff chart supporting panel, a frame for said chart supporting panel to which said chart supporting panel is joined, a chart positioned upon a first surface of said chart supporting panel, said chart bearing numerals arranged in a predetermined array thereon, a first stiff factoring mask having a plurality of apertures therein, each aperture being of sufficient size to expose only one of said numerals on said chart, wherein said plurality of apertures expose a first given numeral less than ten and greater than one as well as multiples thereof, when said first mask is positioned in registration with said chart, and at least a second stiff factoring mask having a plurality of apertures therein, each aperture being of sufficient size to expose only one of said numerals on said chart, wherein said plurality of apertures in said second mask expose a second given numeral, different from first given numeral, and multiples thereof, when said second mask is positioned in registry with the chart, such second given numeral also being less than ten and greater than one, said frame having portions extending forward of the first surface of said chart supporting panel upon which said chart is positioned to form a compartment of a depth equal to at least the combined thickness of said first factoring mask and said second factoring mask in registry, both said factoring masks being slidably receivable in guided relation into said compartment, a portion of said frame forming a backstop for registering said masks with said chart, said apertures conjointly exposing numerals of which both said first given numeral and second given numeral are factors.

2. A mathematics instructing device comprising, a stiff chart supporting panel, a frame for said chart supporting panel to which said panel is attached, a chart positioned upon a first surface of said chart supporting panel, said chart bearing numerals arranged in a consecutive array thereon comprising horizontal rows and wherein said rows are vertically arranged in order, a first stiff factoring mask having a plurality of apertures therein, each aperture being of sufficient size to expose only one of said numbers on said chart, wherein said plurality of said apertures expose a first given numeral less than ten and greater than one as well as multiples thereof, when said first mask is positioned in registry with said chart, at least a second stiff factoring mask having a plurality of apertures therein, each aperture being of sufficient size to expose only one of said numerals on said chart, wherein said plurality of apertures in said second mask expose a second given numeral, different from said first given numeral, and multiples thereof, when said second mask is positioned in registry with said chart, such second given numeral also being less than ten and greater than one, and said frame including members extending forward of the first surface of said chart supporting panel upon which said chart is positioned to form a compartment of a depth equal to at least said first factoring mask and said second factoring mask in registry, both said masks being slidably received into said compartment in guided relation between a pair of said members, said frame including means for registering said masks with said chart, said apertures of said two masks conjointly exposing numerals of which both said first given numeral and second given numeral are factors.

3. A device according to claim 2 wherein said members of said frame include inwardly extending lips at forward edges thereof positioned to secure said masks against said panel when said masks are slidably received into said compartment, while leaving a central open area through which said apertures may be observed.

4. The device according to claim 2 wherein said numerals on said chart are arranged consecutively in horizontal rows of ten.

5. A mathematics instructing device comprising, a stiff chart supporting panel, a U-shaped frame for said chart supporting panel comprising at least a pair of parallel side members adjoining and supporting two edges of said chart supporting panel and a third side member perpendicular to the other two at a perpendicular edge of said chart.

a chart positioned upon a first surface of said chart supporting panel, said chart bearing numerals arranged in consecutive array thereon comprising horizontal rows and wherein said rows are vertically arranged in order, a first stiff factoring mask having a plurality of apertures therein, each aperture being of sufficient size to expose only one of said numerals on said chart, wherein said plurality of apertures expose a first given numeral less than ten and greater than one, as well as multiples thereof, as said first mask is positioned in registry with said chart, and at least a second stiff factoring mask having a plurality of apertures therein, each aperture being of sufficient size to expose only one of said numerals on said chart, wherein said plurality of apertures in said second mask expose a second given numeral, different from said first given numeral, and multiples thereof, as said second mask is positioned in registery with said chart, such second given numeral also being less than ten and greater than one, said U-shaped frame extending forward of the first surface of said chart supporting panel to form a compartment of a depth equal to at least said first factoring mask and said second factoring mask in registry, both said factoring masks being slidably received into said compartment in guiding relation between the parallel side members of said frame, wherein the third side member forms a backstop for registering said masks with said chart, said apertures conjointly exposing numerals of which both said first given numeral and said second given numeral are factors.

6. The device according to claim 5 wherein said frame includes storage means for holding said masks at the rear of said panel on the opposite side thereof from said chart.

7. The device according to claim 5 wherein said numerals are arrayed on said chart consecutively in horizontal rows of ten, said numerals also being arrayed in substantially vertical columns on said chart.

8. A mathematics instructing device comprising, a stiff chart supporting panel, a U-shaped frame for such chart supporting panel comprising a pair of flat side members with their flat sides parallel and a third flat member perpendicular to and adjoining the ends of the other two, said members each being attached at a face thereof to an edge of said panel, a chart positioned upon a first forward surface of said chart supporting panel, said chart bearing numerals arrayed consecutively in horizontal rows of ten, a first stiff factoring mask having edge to edge dimensions only slightly less than said panel and having a plurality of apertures therein, each aperture being of sufficient size to expose only one numeral on said chart, wherein said plurality of apertures expose a first given numeral less than ten and greater than one, and multiples thereof, as first mask is positioned in registry with said chart, and at least a second stiff factoring mask having edge to edge dimensions only slightly less than said panel and having a plurality of apertures therein, each aperture being of sufficient size to expose only one of said numerals on said chart, wherein said plurality of apertures in said second mask expose a second given numeral different from said first given numeral, and multiples thereof, when said second mask is positioned in registry with said chart, said second given numeral also being less than ten and greater than one, the side members of said U-shaped frame extending forward of said chart supporting panel, at least said pair of parallel side members being provided with inwardly extending lips at a distance from said panel equaling at least the combined thickness of said first and second factoring masks to provide a compartment in front of said panel wherein said first and second factoring masks are slidably receivable between said pair of parallel side members, the third side member forming a backstop for registering said masks with said chart, and the front opening between said lips providing a viewing area wherein said apertures conjointly expose numerals of which both said first given numeral and second given numeral are factors.

9. The device according to claim 8 further including supporting means for said frame positioning said panel with a vertical orientation and tilted slightly rearwardly at the top thereof, said pair of parallel side members being disposed substantially horizontally for the reception of said masks therebetween from the side of said frame.

10. The device according to claim 8 wherein said side members extend rearwardly from said chart supporting panel, and further including a rear panel secured to such frame at the rear edge of said side members in a position spaced to the rear of the chart supporting panel in order to form a mask storage compartment with said panel and said frame.

11. The device according to claim 10 wherein said storage compartment is of a depth sufficient for storing at at least seven factoring masks for selectively exposing the numerals 2, 3, 4, 5, 7, 8 and 9 respectively and multiples thereof.

References Cited

UNITED STATES PATENTS

| | | | |
|---|---|---|---|
| 840,144 | 1/1907 | Lincoln. | |
| 2,503,130 | 4/1950 | Poritz | 35—9.1 |
| 2,714,261 | 8/1955 | Hight | 35—31 |
| 3,106,784 | 10/1963 | Raley | 35—31 X |

LAWRENCE CHARLES, *Primary Examiner.*

EUGENE R. CAPOZIO, *Examiner.*

W. GRIEB, *Assistant Examiner.*